Oct. 7, 1958 W. J. HEACOCK 2,854,752
BIN LEVEL INDICATOR
Filed Nov. 29, 1956 4 Sheets-Sheet 1
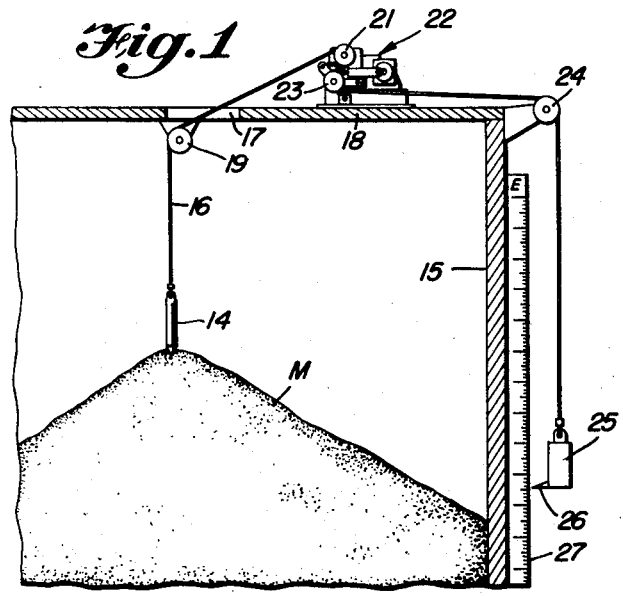
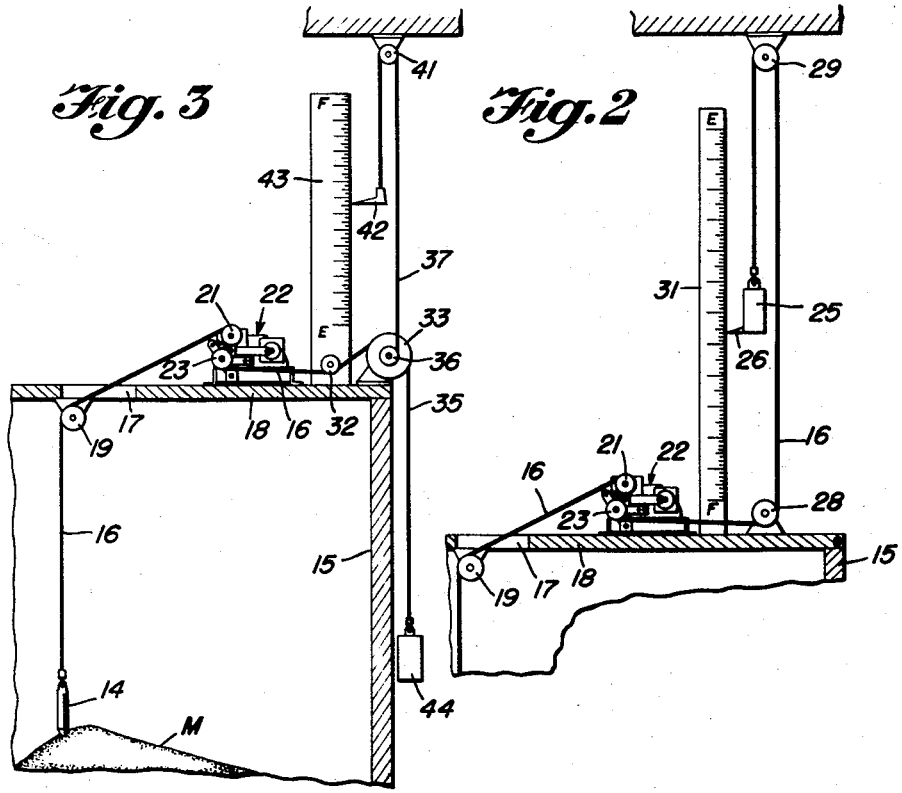

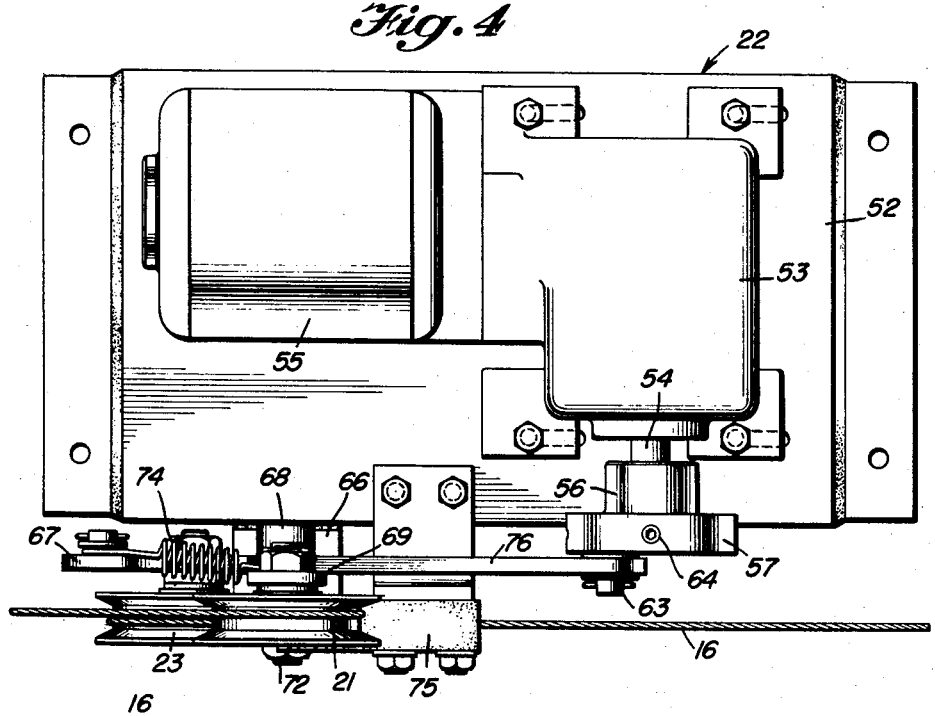
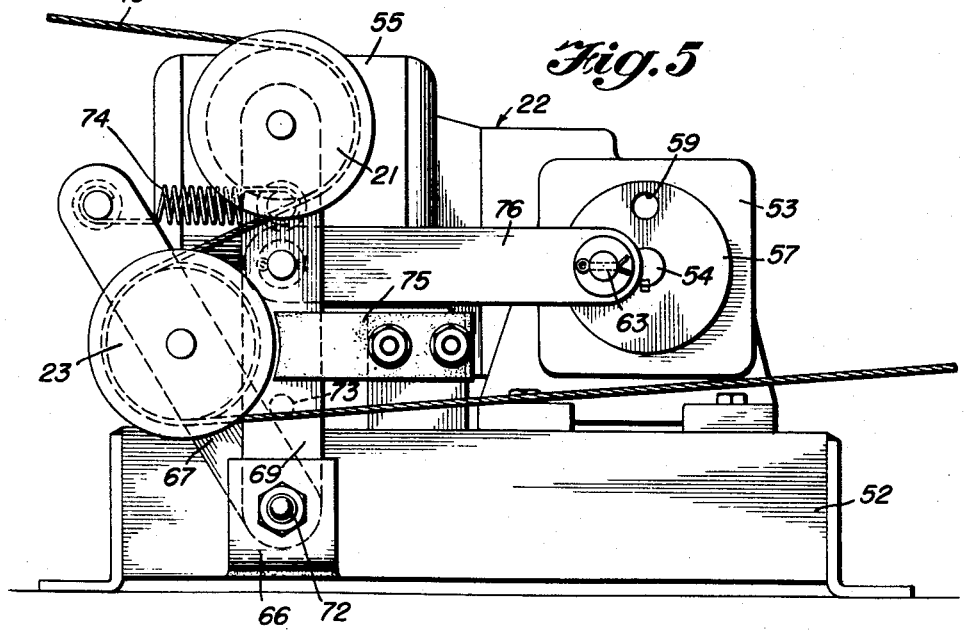

Oct. 7, 1958     W. J. HEACOCK     2,854,752
BIN LEVEL INDICATOR

Filed Nov. 29, 1956     4 Sheets-Sheet 3

Oct. 7, 1958 W. J. HEACOCK 2,854,752
BIN LEVEL INDICATOR
Filed Nov. 29, 1956 4 Sheets-Sheet 4

United States Patent Office 2,854,752
Patented Oct. 7, 1958

2,854,752

BIN LEVEL INDICATOR

Ward J. Heacock, Chicago, Ill., assignor to Link-Belt Company, a corporation of Illinois Application November 29, 1956, Serial No. 625,097

8 Claims. (Cl. 33—126.6)

This invention relates to new and useful improvements in apparatus for measuring and indicating variations in the level of flowable solid material in a bin, or the like, and deals more particularly with apparatus which will function properly to prevent burial of the probe in the material during filling of the bin.

It is the primary object of this invention to provide a drive for operating a flowable solid material level detecting and indicating device for a bin in such a manner as to cause the device to respond to small variations in the level of the material.

Still another object of the invention is to provide a device for detecting the level of a flowable solid material in a bin or the like and for indicating said level on a gauge which may be located for convenient observation at a selected one of a variety of positions.

A still further object of the invention is to provide a device for detecting and indicating the level of a flowable solid material in a bin or the like, the device being adaptable for use in connection with various rates of flow of the material into and from the bin.

A further important object of the invention is to provide a drive device for effecting successive raising and lowering of a cable on which a material surface detecting probe is suspended, the said drive device operating to release the cable during a small part only of each cycle of operation to permit the position of the probe to be adjusted to a new level of the surface of the material during filling or discharging of the bin.

Other objects and advantages of the invention will be apparent in the course of the following description.

Figure 6:
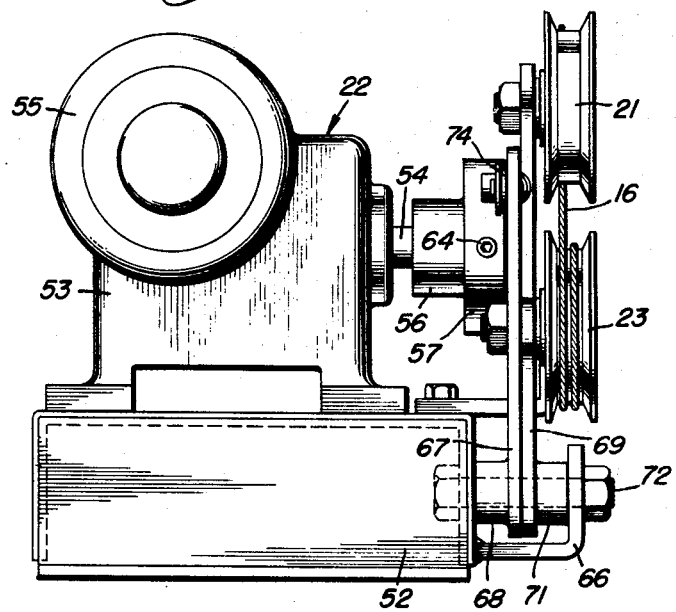
Figure 7:
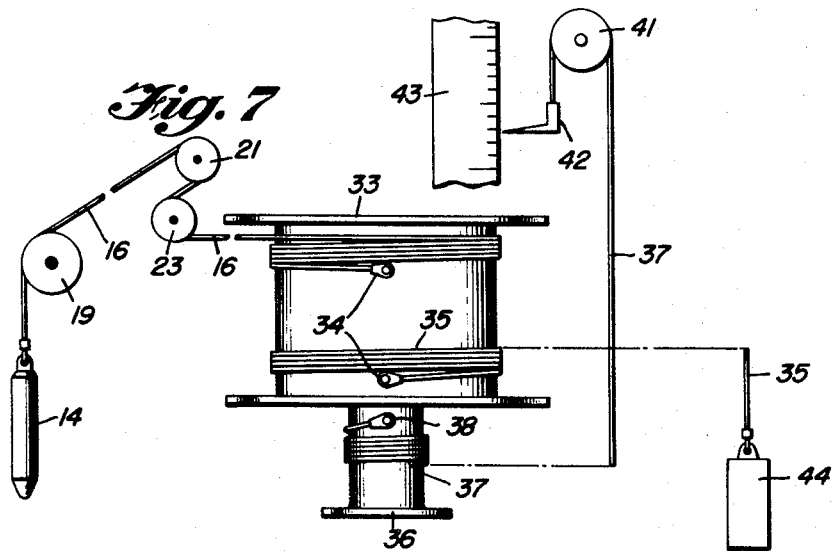
Figure 8:
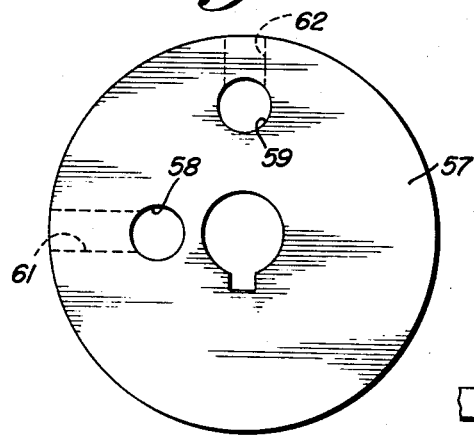
Figure 9:
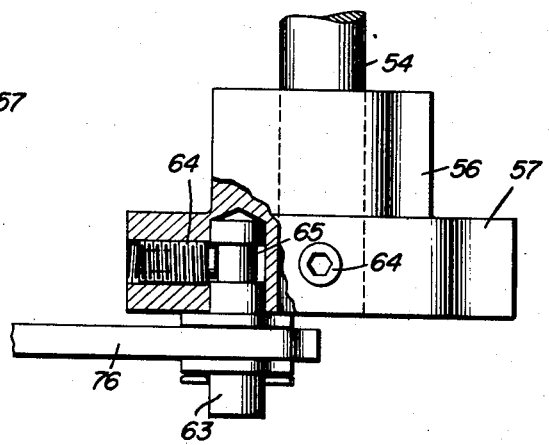
Figure 10:
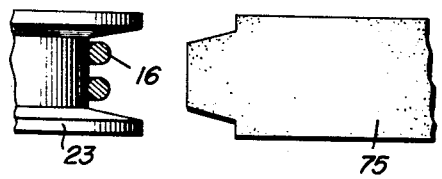
Figure 11:
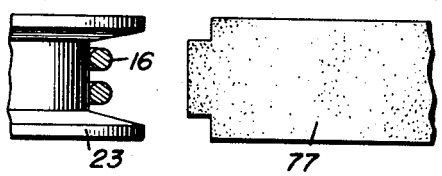
Figure 12:
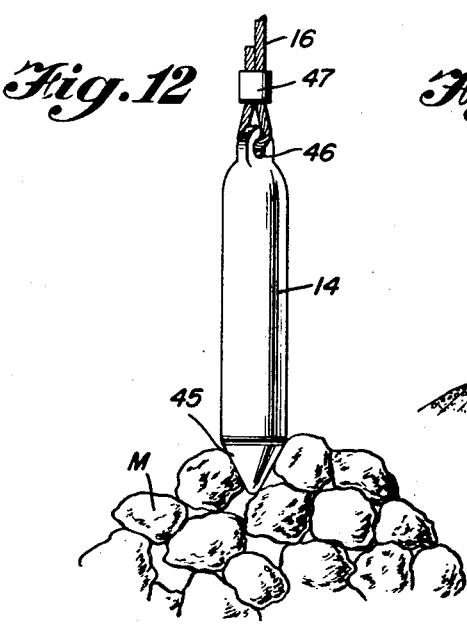
Figure 13:
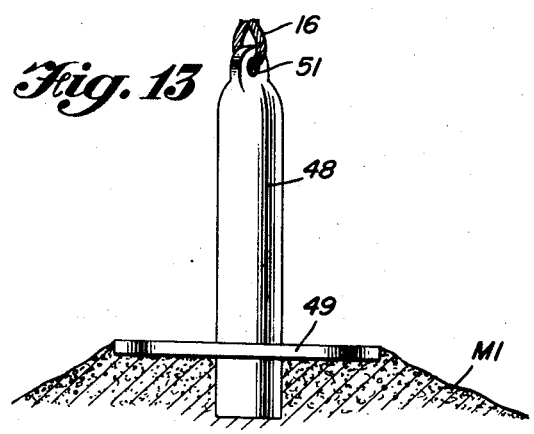

In the accompanying drawings forming a part of this specification and in which like reference characters are employed to designate like parts throughout the same, Figure 1 is a fragmentary, vertical sectional view of a storage bin with apparatus of the invention associated therewith, Figure 2 is a view similar to Fig. 1 but with a modified arrangement of the material level indicating gauge, Figure 3 is a view similar to Fig. 1 but embodying a modification of the invention wherein the level indicating gauge is calibrated to a reduced scale, Figure 4 is a top plan view of the drive for operating the cable on which the material surface detecting probe is suspended, Figure 5 is a side elevational view of the drive illustrated in Fig. 4, Figure 6 is an end elevational view of the drive illustrated in Figs. 4 and 5, Figure 7 is a schematic view showing the calibrating mechanism employed in the modification of the invention illustrated in Fig. 3, Figure 8 is a side elevational view of an eccentric incorporated in the drive of Figs. 4 to 6, inclusive, Figure 9 is a fragmentary top plan view, partly in cross section, of the eccentric of Fig. 8 and an end portion of the connecting rod associated therewith, Figure 10 is an enlarged fragmentary view of the associated portions of the brake block and the pulley engaged thereby in the drive of Figs. 4 to 6, inclusive, Figure 11 is a view similar to Fig. 10 but showing a modified brake block, Figure 12 is an enlarged elevational view of a probe employed for detecting the surface level of the material, and Figure 13 is a view similar to Fig. 12 but shows a modified probe structure for use with easily displaceable material.

In the drawings, wherein for the purpose of illustration are shown the preferred embodiments of the invention, and first particularly referring to Figs. 1 to 3, inclusive, there are illustrated three different arrangements of apparatus for detecting and indicating the top level of flowable solid material in a bin, or the like. The apparatus illustrated in Fig. 1 employs a probe 14 for engaging and thereby detecting the top surface level of material M in a bin 15. The probe 14 is suspended by a cable 16 which passes through a slot 17 in the top wall 18 of the bin and is supported adjacent the slot by a pulley 19. From the pulley 19, the cable 16 extends to and around the upper pulley 21 of a drive unit 22 and then passes around the lower pulley 23 of the said unit so as to form an S-shaped loop with the portion of the cable extending between the pulleys being doubled back in direction upon the remaining portion of the cable. From this lower pulley 23, the cable extends laterally across the top of the bin 15 to the pulley 24 at the side of the latter. After leaving the pulley 24, the cable 16 extends downwardly and has suspended on its lower end a counterweight 25 that includes a marker 26 which is vertically movable along the scale 27 to provide a gauge for determining the level of the top surface of the material M in the bin.

The drive 22 subsequently will be more fully described, but it will be noted at this point that the upper and lower pulleys 21 and 23 are so actuated as to repeatedly raise and lower the probe through the cable 16 and to release the cable for free movement thereof during a portion of each cycle of operation to permit the probe 14 to seek a new level of the top surface of the material M in the bin. Since the probe 14 is heavier than the counterweight 25, the probe will always engage the surface of the material M when the cable 16 is released and the counterweight 25 will assume a position which corresponds with that of the probe so that the marker 26 will indicate on the scale 27 the level of engagement between the probe and the material.

Figure 2 illustrates a modified arrangement of the apparatus wherein one portion of the cable 16 leading from the drive unit 22 is trained under a pulley 28 mounted on the top wall 18 of the bin 15. This portion of the cable then passes upwardly from the pulley 28 and over a pulley 29, mounted in spaced relationship above the top wall 18 of the bin, to the counterweight 25 that is suspended for vertical movement of its marker 26 relative to a scale 31 that rises upwardly from the top wall 18 of the bin. Except for the arrangement of the pulleys 28 and 29 and the scale 31, the apparatus illustrated in Fig. 2 is identical to that illustrated in Fig. 1 and corresponding reference characters have been given to the corresponding parts of both.

The apparatus illustrated in Fig. 3 employs a probe 14 which is suspended on a cable 16 in a bin 15 and is associated with a drive unit 22 in the same manner as was previously described in connection with Figs. 1 and 2. These portions of the apparatus illustrated in Fig. 3, therefore, will not again be described, and corresponding parts thereof have been given reference numerals corresponding to those employed in connection with Figs. 1 and 2.

From the drive unit 22 illustrated in Fig. 3, one portion of the cable 16 extends laterally across the top of the bin 15 and beneath a pulley 32. After leaving the pulley 32, the cable is wrapped around a drum 33 and has its end secured thereto by a clevis 34, as illustrated in Fig. 7. The drum 33 also has wrapped therearound a cable 35 which has one end secured thereto by a second clevis 34. The oppositely wound arrangement of the two cables 16 and 35 on the drum 33 will cause the cable 35 to be unwound from the drum as the cable 16 is wound thereon and to be wound on to the drum as the cable 16 is unwound therefrom.

Mounted on one end of the drum 33 is coaxial relationship therewith is a smaller drum 36 having a cable 37 wrapped therearound in such a direction that winding in of the cable 16 will also effect a winding in of the cable 37 on its associated drum 36. The end of the cable 37 is secured to the drum 36 by a clevis 38 and the cable extends from the drum upwardly and over a pulley 41 to suspend the marker 42 for vertical movement along a scale 43. It will be noted that no counterweight is attached to the marker 42, but a correspondingly operative counterweight 44 is suspended on the cable 35 which extends downwardly from the drum 33.

By reference to Fig. 12, it will be seen that the probe 14, employed in connection with the apparatus illustrated in Figs. 1 to 3, inclusive, has its lower end portion tapered to provide a point 45 and its upper end portion formed with a hole 46 for receiving the cable 16 which is fastened by a clip 47. The shape of the probe 14, therefore, is such that the point 45 will penetrate slightly into the material M to prevent slipping of the probe along the top surface of the material. The greatest cross-sectional area of the probe 14, however, is relatively small and, if the material M is easily displaceable, the probe may penetrate into the material to such a depth that an inaccurate measurement of a surface level would result.

For use in connection with easily displaceable material M1, therefore, a modified probe 48, as illustrated in Fig. 13, is employed. This probe 48 has a flange 49 near the lower end portion thereof and the upper end portion has a hole 51 for receiving the cable 16 to which it is connected. The greatly enlarged cross-sectional area provided by the flange 49 will prevent penetration of the probe 48 into the loosely packed material M1 so that the probe will provide an accurate measurement of the upper material surface level.

Referring now to Figs. 4, 5 and 6 for a detail description of the drive unit 22, it will be noted that the unit is provided with a base 52 formed of suitably reinforced structural members. Mounted for longitudinal adjustment on the base 52 is a gear reducer unit 53, the output shaft 54 of which extends laterally of the base and is positioned above one side thereof. A motor 55 is connected to the gear reducer 53 for operating the latter to cause rotation of the output shaft 54 at the relatively slow speeds of, for example, twelve revolutions per minute.

Mounted on the outer end portion of the output shaft 54 of the gear reducer 53 is a hub 56 of the disc 57. The hub 56 and its associated disc 57 are keyed to the shaft 54 and function as an eccentric crank the effective length of throw of which is adjustable in the following manner:

A pair of holes 58 and 59, see Fig. 8, are formed in the disc 57. The radial distance from the axis of the shaft 54 to the hole 58 is less than that of the hole 59. A threaded passageway 61 extends radially inwardly from the periphery of the disc 57 to intersect the hole 58 and a similar passageway 62 extends inwardly from the periphery of the disc to intersect the hole 59. The inner end portion of a connecting pin 63 is inserted into a selected one of the holes 58 or 59 as illustrated in Fig. 9, and the pin is secured in the hole by a set screw 64 that is threaded into the passageway 61 or 62 and has its inner end portion positioned in a circumferentially arranged groove 65 around the inner end portion of the pin. The pin 63, therefore, is retained against axial movement in its associated hole 58 or 59 and provides a connecting member at a readily adjustable radius from the axis shaft 54.

Mounted on the side of the base 52 and having a portion spaced laterally outwardly therefrom is a bracket 66 which is spaced longitudinally from the output shaft 54 of the gear reducer 53. An inner mounting arm 67, having a hub 68 mounted at one end portion thereof, and a longer outer mounting arm 69, having a hub 71 mounted at one end portion thereof, are arranged with their hubs in back-to-back relationship between the bracket 66 and the side of the base 52. A mounting bolt 72 extends between the side of the base 52 and the bracket 66 and through the aligned hubs 68 and 71 to support the two arms 67 and 69 for pivotal movement about a common axis. As illustrated in Fig. 5, the outer arm 69 has mounted on its inner surface a stop or lug 73 which will be engaged by the arm 67 to limit movement of the latter toward a position of alignment with the arm 69. The stop 73, therefore, provides a position of minimum angular relationship between the two arms 67 and 69. The two arms 67 and 69 are urged toward such position by a spring 74 which is connected between the arms 67 and 69.

The pulley 21 is rotatably mounted at the outer end portion of the arm 69 and is radially aligned with the pulley 23 that is mounted on the middle portion of the arm 67. The portion of the cable 16 extending from the probe is trained partly around the pulley 21 and then extends to the pulley 23 about which it is wrapped approximately one and one-half turns. The portion of cable 16 which passes around the pulleys 21 and 23 forms an S-shaped loop with the portion of the cable extending between the pulleys being doubled back in direction upon the remaining portion of the cable, which doubled back portion will be increased in length by relative movement of the two arms 67 and 69 away from each other which will be shortened by relative movement of the two arms towards each other. Fig. 5 shows the brake block 75 as being mounted on the base 52 in alignment with the pulley 23. Fig. 10 shows this brake block as being shaped to engage only the cable 16. Fig. 11 shows a brake block 77 which may be substituted for block 75 in Fig. 5 and which is shaped to engage only the pulley 23. It will be readily apparent, therefore, that engagement of the pulley 23 (Fig. 11), or the cable wound thereon (Fig. 10), by the brake block 75 or 77, respectively, to hold the pulley and the cable in a stationary position while the arm 69 moves away from and toward its position of minimum angular relationship with the arm 67 will raise and lower the probe 14 which is connected directly to that portion of the cable leading from the pulley 21. Oscillating movements are imparted to the arm 69 by the connecting rod 76 which is pivotally connected to the arm and to the pin 63 associated with the disc 57.

By reference to Fig. 5, it will be noted that movement of the link 76 to oscillate the arm 69 to its extreme left-hand position, as viewed in Fig. 5, will act through the contact of the stop 73 with the arm 67 to cause the pulley 23 to be moved away from the brake block 75, or 77, so that both pulleys are free to rotate to permit movement of the cable 16 thereon. It will also be noted that, when the pulley 23 is moved into engagement with the brake block 75, or 77, the extent of movement of the arm 69 will determine the force applied by the spring 74 in frictionally engaging the brake block 75, or 77, with the cable 16, or the pulley 23, respectively.

The operation of the drive unit 22 will be described briefly as follows:

The gear reducer 53 is operated by the motor 55 to continuously rotate the disc 57 on the output shaft 54 of the reducer. This rotation of the disc 57 causes it to function as a crank or eccentric and, through its associated connecting rod 76, to oscillate the arm 69 about the axis of the bolt 72. During a major portion of each oscillation of the arm 69, the pulley 23 and the cable 16 thereon will be held in a stationary position by engagement with the brake block 75, or 77. While the pulley 23 is held stationary, however, the length of the doubled back portion of the cable 16 extending between the pulleys is increased and decreased by movements of the pulley 21 relative to the pulley 23 so that the cable 16 will repeatedly raise and lower the probe 14 connected to the cable 16, as illustrated in Figs. 1 to 3, inclusive. At the end portion of each oscillation of the arm 69, in one direction, the stop 73 is moved into engagement with the arm 67 to limit any further relative movement between the two arms. The arm 67 is thereupon moved with the arm 69 to displace the pulley 23 from the brake block 75, or 77. Both of the pulleys 23 and 21 are thereupon freed for rotation to permit movement of the cable 16 thereover. When the cable 16 is thus released, the weight of the probe 14 will cause it to drop into engagement with the upper surface of the material M in the bin 15.

Of course, if the level of the material M in the bin 15 remains constant, or is increased during one period of raising and lowering of the probe 14, the surface of the material will be engaged by the probe before the cable 16 is released for movement over the pulleys 23 and 21. If the level of the material M has decreased, however, the release of the cable 16 will permit the probe 14 to drop into engagement with the material. After the probe 14 has engaged the material M, the portion of the cable 16 which extends from the drive unit 22 for operative connection with the counterweight and marker 25 and 26, or 44 and 42, as the case may be, is maintained in a state of tension and the marker will assume a position along its associated scale 27, 31 or 43 which indicates the level of the material M in the bin 15.

Because of the frequent and relatively short vertical reciprocations of the probe 14, small changes in the level of the material M will be quickly and accurately detected and indicated on the scale associated with the apparatus. On the other hand, if the discharge rate of the material from the bin 16 exceeds the rate at which the probe 14 is lowered by the drive unit 22 when the connecting pin 63 is set in the hole 58, the pin may be moved to the hole 59 so that the pulley 23 will be moved to a position for releasing the cable 16 during a longer period of time. Also, if the filling rate is excessive, movement of the pin 63 to the hole 59 will lengthen the oscillation strokes of the arm 69 to the right in Fig. 5 which will result in raising the probe 14 a greater distance to keep it from being buried in the material.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The combination with a probe, a cable suspending said probe for vertical repicrocation into and out of engagement with the upper surface of a body of material, and a marker supended for vertical movement relative to a scale and operatively connected to said cabel for movement thereby to positions corresponding to the positions of engagement of said probe with the surface of said material, of a drive operatively associated with said cable for alternately raising and lowering said probe and for releasing the cable to permit movement of the latter to a balanced position at which said probe is in engagement with the upper surface of said material and said marker is at its corresponding position relative to its scale, said drive comprising first and second pulleys about which said cable is trained to form an S-shaped loop therein with the portion of said cable extending between said pulleys being substantially doubled back in direction upon the remaining portion of said cable, means mounting said pulleys for movement of said first pulley, from which the cable extends from said drive and leads to said probe, relative to said second pulley to increase and decrease the length of said doubled back cable portion to raise and lower said probe, means for intermittently imparting to said first pulley a cycle of such relative movement, each cycle of relative movement first raising and then lowering said probe, brake means for preventing movement of said second pulley and the cable thereabout during each of said cycles of relative movement of said first pulley, and means for disengaging said brake means only between said cycles of relative movement to permit movement of the cable about the second pulley.

2. The combination defined in claim 1 further characterized by said pulley mounting means comprising a pair of pulley supporting members mounted for independent movement and each having one of said first and second pulleys rotatably connected thereto, and said means for disengaging said brake means comprising a stop carried by one of said members for engaging the other member to limit relative movement of the two members toward each other and to cause said means for imparting said relative movements to said first pulley to jointly move said pulley supporting members and their associated pulleys and disengage said brake means.

3. The combination defined in claim 2 further characterized by said brake means comprising a stationary block mounted for frictional engagement by said second pulley to hold the latter in a stationary position while said first pulley has said relative movements imparted thereto.

4. The combination defined in claim 2 further characterized by said brake means comprising a block mounted in a stationary position and having a surface arranged for frictional engagement by the portion of said cable that is trained around said second pulley to hold the pulley and the portion of the cable leading therefrom for operative connection to said marker in stationary positions while said first pulley has said relative movements imparted thereto.

5. The combination with a probe, a cable suspending said probe for vertical reciprocation into and out of engagement with the upper surface of a body of material, and a marker suspended for vertical movement relative to a scale and operatively connected to said cable for movement thereby to positions corresponding to the positions of engagement of said probe with the surface of said material, of a drive operatively associated with said cable for alternately raising and lowering said probe and for releasing the cable to permit movement of the latter to a balanced position at which said probe is in engagement with the upper surface of said material and said marker is at its corresponding position relative to its scale, said drive comprising first and second pulleys about which said cable is trained to form an S-shaped loop therein with the portion of said cable extending between said pulleys being substantially doubled back in direction upon the remaining portion of said cable, the cable extending from said drive from said first pulley and leading to said probe, a pair of arms mounted for independent pivotal movement about a common axis and each having one of said first and second pulleys rotatably connected thereto, said first pulley being mounted at a greater radial distance from said common axis than said second pulley, means for intermittently imparting pivotal movement to said first pulley and the arm associated therewith relative to said second pulley to increase and decrease the length of said doubled back cable portion to raise and lower said probe, brake means for preventing movement of said second pulley and the cable thereon during said relative movements of said first pulley in respect to said second pulley, and means for disengaging said brake means to permit movement of the cable on said pulleys between said relative movements of said first pulley in respect to said second pulley, said means including a stop carried by one of said arms for engaging the other arm to provide a position of minimum angular relationship between said arms at which said arms are jointly movable.

6. The combination defined in claim 5 further characterized by resilient means operatively connected to said arms for urging the latter to said position of minimum angular relationship and for yieldably urging said second pulley into engagement with said brake means while said first pulley has said relative movements imparted thereto.

7. The combination defined in claim 5 further characterized by means for intermittently imparting said relative movements to said first pulley comprising a prime mover, crank means operated by said prime mover and a link connecting said crank means to the arm associated with said first pulley for oscillating the arm about its axis of pivotal movement, said brake means being mounted for engagement by said second pulley during a major portion of each of said oscillations of the arm to permit said relative movements of said first pulley, and said arms being moved to said position of minimum angular relationship for further joint movement to disengage said second pulley from said brake means during the remaining portion of each of said oscillations.

8. The combination defined in claim 7 further characterized by said crank means comprising a disc having a plurality of holes in one side face thereof at different radial distances from the axis of the disc, a threaded passageway extending radially outwardly from each of said holes to the periphery of said disc, a connecting pin rotatably connected to one end portion of said link and having one end portion adapted to be inserted into a selected one of said holes, said one end portion of the pin having a circumferentially extending groove formed therein, and a set screw threaded into the passageway associated with the selected hole and into said circumferentially extending groove to retain said pin in the hole.

References Cited in the file of this patent
UNITED STATES PATENTS
1,760,204    Mittendorf _____ May 27, 1930